ELECTRET ACOUSTIC TRANSDUCER

Original Filed April 3, 1970 2 Sheets-Sheet 1

INVENTOR.
PRESTON V. MURPHY
BY Kenway, Jenney & Hildreth
ATTORNEYS

ELECTRET ACOUSTIC TRANSDUCER

Original Filed April 3, 1970 2 Sheets-Sheet 2

INVENTOR.

PRESTON V. MURPHY

BY Kenway, Jenney & Hildreth

ATTORNEYS

United States Patent

Re. 28,420

Reissued May 13, 1975

28,420

ELECTRET ACOUSTIC TRANSDUCER

Preston V. Murphy, Weston, Mass., assignor to Thermo Electron Corporation, Waltham, Mass.

Original No. 3,612,778, dated Oct. 12, 1971, Ser. No. 25,539, Apr. 3, 1970, which is a continuation-in-part of abandoned application Ser. No. 638,463, May 15, 1967. Application for reissue Mar. 30, 1973, Ser. No. 347,322

Int. Cl. H04r *19/04*

U.S. Cl. 179—111 E 6 Claims

Matter enclosed in heavy brackets [ ] appears in the original patent but forms no part of this reissue specification; matter printed in italics indicates the additions made by reissue.

ABSTRACT OF THE DISCLOSURE

A method of making electrets, comprising the steps of (1) internal polarization of a selected thermoplastic using an ionized gas, to contact one surface and serve as one electrode while a metal film serves as a second electrode, and applying a constant electric bias while the material is heated to a softened condition and then gradually cooled, and (2) by a secondary process, applying an electrostatic charge to the exposed dielectric surface of the electret.

An electroacoustic transducer is described in which at least one of the electrodes is fixed to an electret, the electret electrode combination serving either as the diaphragm or the backplate of the transducer. The diaphragm is imperforate and the backplate is perforated. An elevated spacer on the backplate contacts the diaphragm at regular intervals to prevent sticking and to control the acoustic response and in such a way as to form a multitude of similar individual transducer cells in parallel.

This application is a continuation-in-part of my pending application entitled Electroacoustic Transducers and Method of Making the Same, Ser. No. 638,463, filed May 15, 1967 and now abandoned.

My invention relates generally to electrostatic devices and particularly to a novel method of making electrets and to novel electroacoustic transducer constructions employing the same.

In order to obtain satisfactory linearity of response in electrostatic transducers such as condenser microphones, electrostatic speakers, vibration transducers and the like, it is necessary to provide a relatively high DC bias on the transducer. It has long been known that, in principle, the necessary bias can be provided by using an electret having a metallized surface as the active element of the transducer.

An electret is a dielectric material that has been subjected to a sufficiently intense electrostatic field to produce a residual internal polarization that persists after the field is removed. The result is an electrostatic charge in the material that serves to supply the necessary DC bias for an electrostatic transducer.

In practice, a number of problems have been encountered in the manufacture and use of electrets that have precluded their widespread adoption. The principal difficulty has been that electrets made from the materials, and by the methods, known prior to my invention have lacked good polarization stability. Extremes of temperature and humidity cause drastic and rapid losses in polarization. Even under controlled conditions, however, the internal charge of conventional electrets gradually decreases at rates too great to be acceptable for most purposes.

Another problem encountered arises from the necessity of including the dielectric material of the electret between the conducting metallic portions of the electrodes of the transducer. The physical thickness of the electret inherently limits the capacitance of the transducer. Early forms of electrets, such as those comprising electrified wax discs, were inherently so limited in this respect that stray capacitances, such as the capacitances between the leads of associated electronic circuits, precluded satisfactory performance.

It has been proposed to solve both problems by making electrets from a thin film such as polyethylene terephthalate, commercially available as Mylar film. Transducers made with electrets of Mylar film do indeed exhibit sufficiently high driving capacitance that stray capacitance in associated circuits does not present a serious problem, and such transducers can be used in relatively low impedance transistor circuits. However, I have found that the apparent polarization stability of such transducers is at least in some part an illusion produced by malfunctioning of the transducer.

Specifically, I have made and tested electrostatic transducers using electrets made from Mylar film. The film is metallized on one side to provide one electrode serving as the diaphragm of a transducer, and confronts on the other side a metal backplate comprising the other electrode of the transducer.

In order to take advantage of the thin Mylar film to obtain high driving capacitance, the electret diaphragm is necessarily mounted very close to the backplate. I have found that in conventionally constructed transducers of this kind, there is a marked tendency for the diaphragm to stick to the backplate when the electret is highly electrified. Such a transducer is initially greatly limited in response by this sticking.

If the sticking just described was the only effect involved, the transducer would exhibit a gradual increase or response as the electret lost polarization, until the sticking problem disappeared and the diaphragm was completely free to vibrate. Thereafter, a continual decrease in response would be found as the electret continued to deteriorate. However, other effects mask this process and give an illusion of stability of response.

First, the diaphragm comprising the electret, initially under tension, tends to relax with time. Thus, the initial response of the transducer, if the electret is not initially too strongly electrified, is improved by the taut diaphragm. As the diaphragm gradually relaxes, the loss in tension tends to reduce response, making the improvement caused by gradual reduction in sticking, so that the net response seems stable. Furthermore, the loss of charge with time tends to compensate in the same manner; the diaphragm tends to stick less because of the decreased electrostatic force, increasing the sensitivity, but the lower charge decreases the sensitivity. In fortuitous cases these compensating factors may result in stable performance of 12 to 18 months, but the sensitivity decreases drastically thereafter.

The objects of my invention are to improve the performance, simplify the construction and reduce the cost of electroacoustic transducers. It will be apparent from the above discussion that those objects could be attained in a transducer of the electret biased-type if the charge stability of electrets could be improved and the tendency for electrostatic sticking could be reduced. Accordingly, particular objects of my invention are to increase the charge stability of electrets, and to minimize electrostatic sticking in electret transducers.

The above and other objects of my invention are attained by a novel transducer construction of my invention incorporating at least two electrodes and an electret of novel construction manufactured in accordance with a new process of my invention.

One of the electrodes in the transducer of my invention is modified by the formation on its surface of integral support elements adapted to contact the electret, and thereby perform two functions. The first is to permit very close but carefully controlled spacing of the electrodes and thereby attain a high sensitivity. The second is to permit the use of a strong electret without the loss of response attendant upon the sticking of the electret to the other electrode.

A regular support pattern embossed on the backplate provides multiple support for the diaphragm and in a sense produces multiple microphone elements in parallel. Each element is optimized with respect to spacer height and cell area for high sensitivity, and appropriate compliance and acoustic resistance.

The electret of my invention is preferably made from a thermoplastic polymeric dielectric material selected from the class consisting of films of polycarbonates, polyimides, polyhalocarbons, polyphenylene oxide, polysulfone, polyvinylidine chloride and their copolymers. I have found such films to make electrets of surprisingly good charge stability, as compared with such apparently similar films as those of Mylar and the like. In some instances, the basic film is of a material selected from the above class on which a surface coating of the class consisting of polymers and copolymers of styrene, halocarbons and vinylidine chloride is formed, the coating being dissimilar to the film, however, I have found that materials of this class are surprisingly superior to other materials in their ability to assume and maintain a surface electrostatic charge. It should be noted that polyhalocarbon and polyvinylidine chloride films have both desirable bulk and surface properties so that coatings are not required. While for some purposes the dielectric material may be used alone, for use in the transducers of my invention, it is metallized on one side in any conventional manner known to the art, or bonded to a metal sheet or foil.

While I have found that a number of polymer films from the generic classes listed above are superior to Mylar in electret properties, the best performance has been obtained with the fluorohalocarbon film sold commercially by the Allied Chemical Corporation under the trade name Aclar. In fact, there are at least two forms of Aclar available: Aclar 33 C which is believed to be 97–98 percent poly (chlorotrifluoroethylene) with 2–3 percent tetrafluoroethylene added as a cooplymer and Aclar 22 C which is believed to be 97–98 percent poly (chlorotrifluoroethylene) with 2–3 percent vinylidene fluoride and tetrafluoroethylene added to give a terepolymer. I prefer to use Aclar 33 C which currently is available in thicknesses of 0.005 inch, 0.0075 inch and 0.0001 inch; Aclar 22 C which is available in 0.001 inch thickness also has given satisfactory performance.

While Aclar possesses several advantages for use as an electret material, the most outstanding advantage which sets it apart from all other available materials is the stability of its charge under the prevailing environmental extremes of temperature and humidity. High humidity (90–95 percent) has been found to be the single most important cause of electret charge loss; moisture permeates all plastic films, more or less, absorbs and causes charge leakage. Aclar has the smallest moisture permeability and absorptivity of any polymer and I have found that high humidity does not cause loss of charge for Aclar. (No measurable loss of charge after 1 year at 92 percent RH.) Furthermore, Aclar is a temperature resistant polymer and charge is not lost during severe military environmental testing which requires prolonged exposure to 71° C. and 95 percent relatively humidity (MIL-STD 810 A). Finally, Aclar has outstanding mechanical properties; for example, the tensile strength is double that of FEP Teflon thus permitting high tension on microphone diaphragms, and the film can be bonded readily to retainers or substrates using either adhesives (epoxies) or thermal bonding techniques.

The electret is prepared from a film or sheet of the selected material by a two-step process of my invention. In the process, the dielectric material is first internally polarized by subjecting it to a high DC field while the material is heated to a temperature at which it is relatively soft. By "relatively soft," I mean the plastic amorphous state in which the material can be formed, and in which it exhibits no substantial tensile strength. A metal electrode is permanently attached to one side of the dielectric material and an ionized gas (air, inert gases, or other gases), produced by an AC source of radio frequency voltage or by a DC corona discharge, contacts the other side during electrification. A screen grid controls the potential at the surface contacted by the ionized gas. The field is maintained while the material is cooled slowly to the solid state. By "solid state," I mean the state in which the material exhibits the properties of tensile strength and flexibility characteristic of sheet or film material as normally specified for use as such. Next, the surface of the internally polarized electret is given a surface charge. This surface charge may be applied by increasing the DC field to very high values, greater than $10^5$ volts/cm., while maintaining the contact between the ionized gas and the exposed dielectric surface. Alternatively, the charge may be applied after polarization by rubbing the dielectric surface with a material of opposite charge selectivity. I have found that a very strong and stable electret can be produced in this manner.

The manner in which the method of my invention is best carried out, and the details of the apparatus of my invention, will best be understood in the light of the following detailed description, together with the accompanying drawings, of various illustrative embodiments thereof.

In accordance with my invention, the dielectric material from which an electret is made is selected on the basis of two properties. The first is the ability to assume and maintain an internal, or bulk, electrostatic charge. A dielectric material best suited for bulk polarization has a polar molecular structure low mobility for charge transport and diffusion, a high concentration of deep traps for ions and electrons, and a high glass or crystalline transition temperature. A second basic desirable property is the ability to assume and maintain a surface charge. For that purpose, the material should have high resistivity, proper charge selectivity and low vapor absorption. Of the vast array of available dielectrics, I have found that commercially available polycarbonate, polyimide, polyhalocarbon, polyphenylene oxide, polysulfone and polyvinylide chloride sheets and films, and sheets and films of copolymers of those materials, are surprisingly well suited to the manufacture of electrets, in that they all exhibit to an unexpected degree the desirable properties needed for both bulk and surface polarization. These materials may be further improved by surfaec treatment to give improved surface polarization properties. The surface properties of films of polystyrene and its derivatives, polyhalocarbons, and polyvinylidine chloride are especially good. If these materials are coated on, or copolymerized at the surface with, the material selected for the body of the electret, a material having superior bulk and surface properties can be made. While a number of the polymer films from the generic classes listed are superior to Mylar in electret properties. I prefer to use the fluorohalocarbon film known as Aclar for the reasons noted previously.

Figure 1:
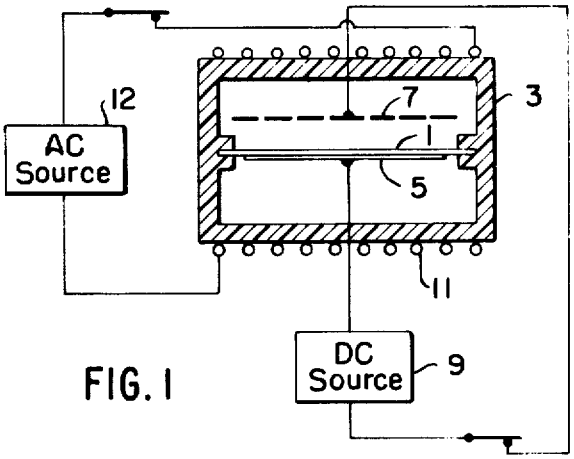
FIGS. 1 and 1A are schematic views, with parts shown in cross section, of apparatus for carrying out a step in the process of manufacturing an electret in accordance with my invention.

The method of making an electret from the selected material in accordance with my invention makes use of both bulk and surface polarization. FIG. 1 illustrates the apparatus used for both bulk and surface polarization. The first step in the process is the bulk polarization of the material.

The dielectric material 1, in the form of a film or sheet, is suspended as schematically indicated within a suitable furnace 3. The material 1 is provided with a metallic coating on its lower surface as seen in FIG. 1, and the metallic coating is in direct mechanical and electrical contact with a first electrode 5. Spaced above the dielectric material 1 is a second electrode 7, in the form of a grid.

A conventional DC source of high voltage, shown schematically at 9, is connected between the electrodes 5 and 7. The DC source 9 should be capable of producing a DC field strength of about 10 to 200 kilovolts per centimeter in the region between the electrodes 5 and 7 in which the material 1 is located.

While the furnace 3 may be heated in other ways, preferably an induction heating coil 11 is provided. The coil 11 is disposed in any convenient way surrounding the dielectric material and the electrodes 5 and 7. It may be energized by a conventional AC source of radio frequency voltage shown schematically at 12. The field produced by the coil 11 should be sufficient, not only to heat the dielectric material 1 to the desired temperature but to produce substantial ionization in the gas, such as air or the like, in the furnace. This ionized gas provides a plasms electrode of greatly reduced impedance relative to the impedance of the ionized gas, and serves to connect the electrode 7 to the upper surface of the dielectric material 1. I have found that this arrangement produces a more uniform surface charge on the dielectric material than could be produced by a continuous electrode in direct contact with the dielectric surface, and avoids the problem inherent in the latter arrangement that result from local breakdown in the dielectric.

If means other than an induction field is used as a heat source, the AC field needed to produce ionization can be provided by a screen grid located above the screen 7 in the furnace 3, and the AC source connected between that screen and the electrode 5. Alternatively, the AC source could be connected between the electrodes 5 and 7 with conventional means provided to isolate the AC and DC sources. It might be supposed that the alternating field would have no effect or would detract from the effect of the DC field, but I found that a higher degree of polarization can be attained by the use of the superimposed fields. The material 1 is heated to a temperature at which it is relatively soft, such as 250° C. for a polycarbonate dielectric; or 120° C. for Aclar. It is maintained at that temperature in the superimposed fields for from 10 to 100 minutes. The heat is then turned off, while the DC field is maintained for an hour or two while the material cools to room temperature.

After the bulk polarization just described, the electrostatically charged material 1 is given a surface charge. The dielectric surface on the side opposite the metal coating may be charged to the selected polarity either by exposing the material to an ionized gas produced as before, by corona or an AC field while a very high bias is applied, or by rubbing it with another material selected in a known way to exhibit an opposite charge selectivity. In the preferred procedure, the DC bias from the source 9 is increased to produce a field of about 200 kv./cm. in the material 1. A net charge, defined as the surface charge minus the bulk polarization, of $10^{18}$ to $10^{17}$ coulombs per square centimeter has been produced routinely by this procedure.

Figure 1A:
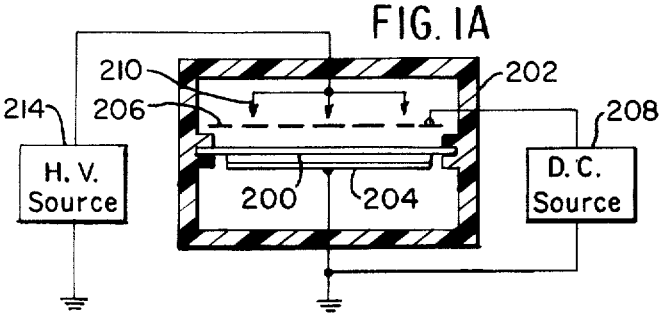

In FIG. 1A there is shown an experimental arrangement used for making the electret by the technique described above in which the induction field is substituted by independent means for heating and producing ionization. Again, the material in the form of a sheet 200 is suspended in a suitable furnace to be softened to the desired degree as outlined hereinabove. A flat metallic electrode 204 which may be at ground potential is disposed beneath the material 200. Above the sheet 200 is a control grid 206 to which the high potential terminal of a DC voltage source 208 is connected. A corona electrode 210 penetrates the furnace wall and has its active element above the grid 206. A high voltage source 214 of corona voltage, which may be either AC or DC is connected between the corona electrode 210 and ground.

The process of charging the electret material with the apparatus of FIG. 1A is similar to that using the apparatus of FIG. 1 except that any suitable heating method may be used while the corona discharge produces ionization of the gas in the furnace to charge the material.

Figure 2:
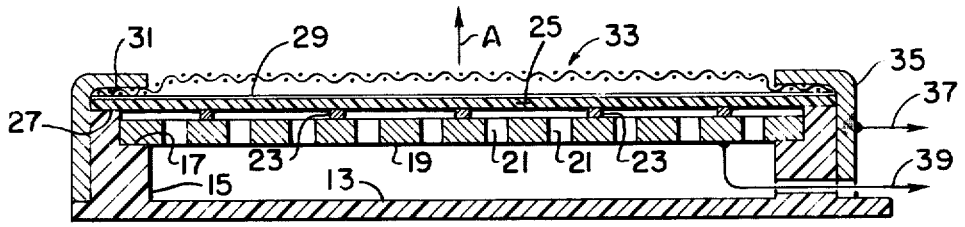
FIG. 2 is a cross-sectional elevation of a transducer is accordance with my invention.
Figure 3A:
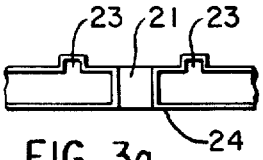
FIG. 3A is a sectional view taken along line 3—3 of FIG. 3 showing an alternate embodiment of the backplate.
Figure 3:
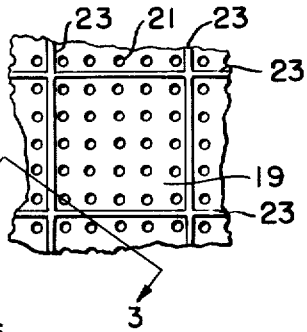
FIG. 3 is a fragmentary plan view on an enlarged scale of a portion of an electret backplate forming a part of the apparatus of FIG. 2.

FIGS. 2 and 3 show an electrostatic transducer incorporating an electret preferably made by the process just described. The apparatus of FIG. 2 is symmetrical about the axis A, with minor exceptions that will be apparent from FIGS. 2 and 3 and so its construction can be understood from the single view.

The transducer includes a base plate 13 of plastic or the like, provided with an upstanding annular flange 15. The flange 15 is formed with a ledge 17 to support a metal backplate 19.

The backplate 19 is perforated with a series of apertures such as 21, preferably by chemical milling. The apertures 21 are preferably about 5 mils in diameter and spaced on 15 mil centers, although various other sizes and spacings may be employed. The apertures serve to provide an air passage through the backplate, allowing the space between the backplate and the baseplate 13 to serve as an acoustic compression chamber.

On the upper surface of the backplate 19 is formed a mesh of fine metal wires 23, of electroformed nickel or the like, and preferably about one-fourth mil in diameter. The wires are spaced from 40 to 100 mils apart and are secured in any conventional manner, as by welding or the like, to the backplate 19. The height and area of each element may be designed so that electrostatic forces from the electret do not overcome restoring forces provided by foil tension and thereby cause the foil to stick to the recessed part of the backplate. Appropriate dimensions are 1 mil height, 50 mil x 50 mil area, with one or more holes in the center of total area equal to about 18 percent of the cell area. Alternatively, the wires 23 may be formed integrally with the backplate. Still another suitable alternative is to replace the wires 23 by a series of raised posts, formed integrally with the backplate. These posts are preferably from one-eighth to one-half mil in height, from 2 to 5 mils in diameter, and spaced from 20 to 60 mils apart. Alternatively, the backplate including the support grid can be fabricated by injection molding of plastic followed by metallizing to provide conductivity. Metallized layer 24 is seen in FIG. 3A.

Above the backplate 19 is an electret diaphragm generally designated 25 having an exposed dielectric surface 27 and an upper metallized surface 29. The diaphragm 25 may be slightly spaced from or in contact with the wires 23, but in any event the latter limit the minimum spacing between the diaphragm and the backplate and prevent the diaphragm from electrostatically sticking to the backplate.

As a result of the presence of the metallized plastic, wire grid or metal posts, a large number of individually reacting transducer cells are formed. These cells control the compliance and resistance of the diaphragm and facilitate the optimization of sensitivity and frequency response.

The diaphragm is held in place by the annular rim 31 of a protective metal screen 33 and an outer metal cap 35 that serve to clamp the diaphragm against the flange 15. The cap 35 may be secured to the baseplate 13 in any suitable conventional manner, as by threading the parts, or with an adhesive or the like.

Electrical connections to the transducer of FIG. 2 may be made in various conventional ways. As shown, one lead 37 may be connected to the metal cap 35, making contact with the metal surface 29 of the diaphragm 35 through the cap 35 and the screen 33. A second lead 39 may be connected directly to the backplate 19 and taken out through suitable passages in the baseplate and cap as indicated, with conventional provision for insulation, not shown.

Figure 5:
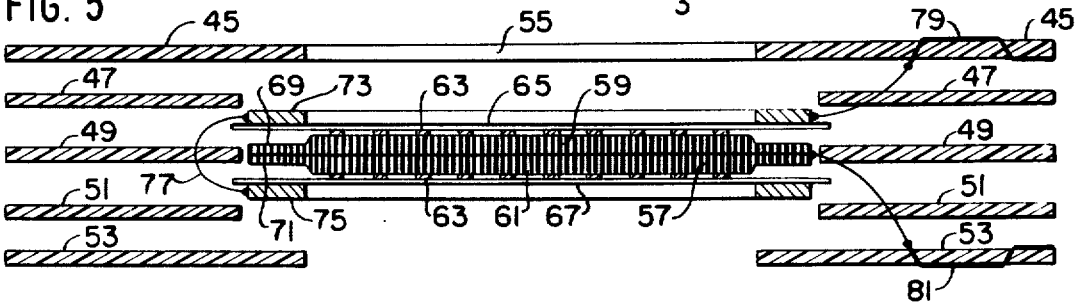
FIG. 5 is a cross-sectional exploded view on an enlarged scale and with parts broken away, taken substantially along the lines 5—5 of the transducer of FIG. 4.
Figure 4:
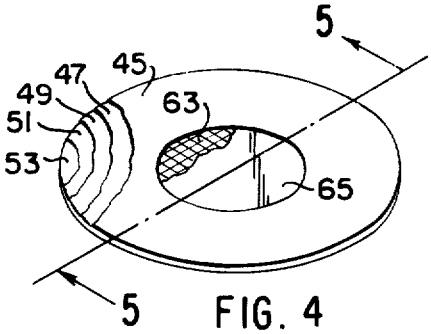
FIG. 4 is a perspective sketch, with parts shown schematically and parts broken away, of a transducer in accordance with another embodiment of my invention.

FIGS. 4 and 5 show a transducer in accordance with a second embodiment of my invention in which two electret diaphragms are employed. In its preferred form the transducer is a pressure-gradient-operated microphone having a figure-of-eight directional response pattern. FIG. 4 illustrates the general appearance of the device when assembled, and FIG. 5 is exploded to show details of the parts.

The apparatus comprises a series of plastic retaining rings 45, 47, 49, 51 and 53. In FIG. 5, I have shown the rear portion 55 of the ring 45, but I have omitted the corresponding portions of the rings 47, 49, 51 and 53 to simplify the drawings.

One electrode of the transducer comprises a double backplate including two chemically milled metal screens 57 and 59 in back-to-back relationship. These screens are provided with holes, such as that indicated at 61 for the screen 57, which may be 5 mils in diameter and spaced on 15 mil centers. These holes provide an air passage through the backplate and serve essentially the same function as the apertures 21 in the apparatus of FIG. 2.

On the upper side of the screen 59 and the lower side of the screen 57 are welded electroformed nickel screens of wires 63 that may, for example, be one-fourth mil in thickness and approximately the same in width. These screens 63 provide support for an upper electret diaphragm 65 and a lower electret diaphragm 67 and also define individual reacting cells.

The electret diaphragms 65 and 67 may be prepared in the manner described above. The outer sides of the diaphragms 65 and 67 are metallized, whereas the dielectric sides are in contact with the screens 63. The individual cells which are formed are much the same in structure and effect as those shown in FIG. 2.

Peripheral flanges 69 and 71 are formed on the screens 59 and 61, respectively, to provide a clamping area for holding the diaphragms 65 and 67 flat and taut. Cooperating metal mounting rings 73 and 75 hold the diaphragms 65 and 67 down against the flanges 69 and 71.

The metal mounting rings 73 and 75 are electrically interconnected as indicated at 77, and an external lead is brought out from the ring 73 as indicated at 79. A lead to the backplate is also brought out to an external contact, as indicated at 80. The terminals 79 and 80 may be connected in any conventional manner to the input terminals of a suitable preamplifier, where it is desired to use the transducer as a microphone, or to the output terminals of a suitable amplifier, for use as a speaker.

The apparatus of FIGS. 4 and 5 is inherently more sensitive for a given area as a corresponding single diaphragm transducer. In the prior art, similar sensitivity has been provided by placing a diaphragm between two rigid backplates. However, the apparatus of FIGS. 4 and 5 has the advantage over that construction that close and controlled spacing between the diaphragms 65 and 67 and their confronting backplates 59 and 57 is inherent. Another advantage is that the outer metallized sides of the diaphragms 65 and 67 provide electrostatic shielding for the input electrode comprising the backplates 57 and 59. Finally, the inner electrified side of each of the electret diaphragms 65 and 67 is protected from atmospheric ions and contaminants. The stability of the apparatus made in accordance with FIGS. 4 and 5 has been found to be exceptionally good.

Figure 7:
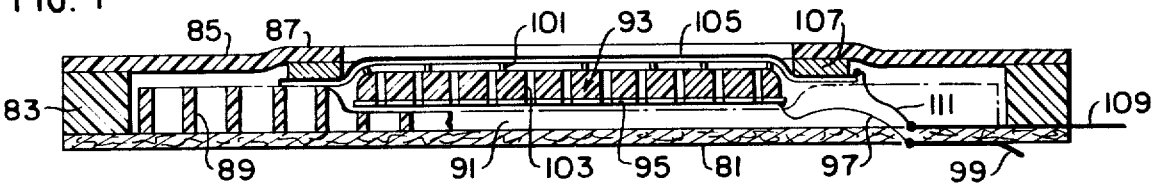
FIG. 7 is a schematic cross-sectional diagram, with parts shown on an enlarged scale relative to other parts and with all parts on a larger scale, of the transducer of FIG. 6 taken substantially along the lines 7—7 of FIG. 6.
Figure 6:
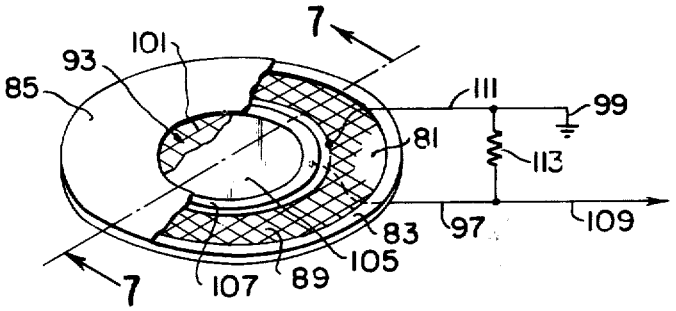
FIG. 6 is a schematic perspective sketch, with parts shown diagrammatically and parts broken away, of a transducer in accordance with another embodiment of my invention.

FIGS. 6 and 7 show another embodiment of the transducer of my invention that has the advantages of great simplicity of construction and long polarization lifetime. The base of the apparatus is formed by a disc 81 of nonporous conducting material.

Supported on and secured to the disc 81 in a conventional way is a plastic spacing ring 83. Mounted on and secured to the ring 83 is a plastic retaining ring 85 provided with an inner raised flange portion 87.

Supported on the plate 81 is a molded plastic mesh screen 89 having a recessed central portion 91 which receives and supports a disc of electret material generally designated 93. In this embodiment of my invention, the electret disc 93 is bonded to the stationary electrode in the transducer.

The electret disc 93 is provided with a metallized bottom layer 95 connected to the bottom side of the disc 81 by a lead 97 and a contact plate 99. The remainder of the electret disc 93 is made from a relatively thick film of one of the plastic materials suggested hereinabove about 9 mils in thickness. Alternatively, a conventional spacer may be used to keep the foil from contacting the electret which is incorporated in the backplate.

The film is preferably embossed to provide a raised grid of support elements 101 approximately one-fourth mil in height. The film is provided with apertures such as 103 for acoustic communication with the chamber formed by the spaces between the elements of the plastic mesh screen 89 and the space above the electret 93. As described above, these apertures 103 may be of about 5 mils in diameter and on centers of about 15 mils. The electret disc 93 may be polarized and charged in the manner described above and, again, individual reacting cells are formed.

The movable diaphragm for the transducer of FIGS. 6 and 7 comprises a metallized plastic foil 105 mounted between the flange 87 and the upper surface of the plastic mesh screen 89 by means of an intermediate metal mounting ring 107. Tthe lower surface of the diaphragm 105, as seen in FIGS. 6 and 7, is a metallized surface. Alternatively, the entire diaphragm 105 may be made of thin metal foil.

The diaphragm 105 is connected to an external contact 109 by means of a lead 111. The contact 109 is also in electrical contact with the upper surface of the conducting backplate 81, so that the effective circuit is as shown in FIG. 6, in which a resistor 113 represents the resistance of the conductive backplate 81. If the device is mounted with the plate 81 in contact with a metal chassis, the contact 99 would serve as ground and the active output terminal would be 109.

The apparatus of FIGS. 6 and 7 is readily manufactured by conventional plastic molding techniques. In addition, the use of the electret disc 93 as a stationary electrode makes possible a more massive construction. With such a construction, polarization lifetime is increased, because internal short circuiting is more effective in the thicker structure. For example, with the dimensions described, a polarization lifetime of 25 times the lifetime of the one-fourth mil electret foil has been found.

Figure 8:
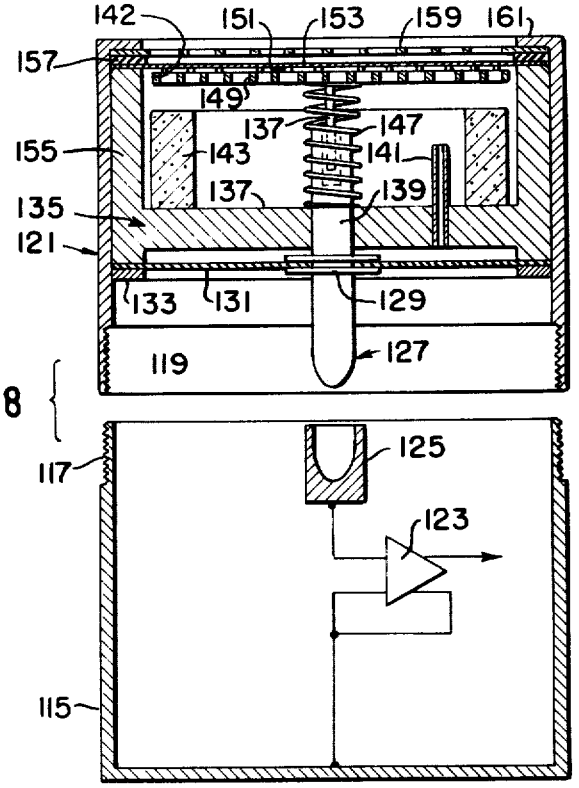
FIG. 8 is a cross-sectional elevational view of another embodiment of the transducer of my invention, with an associated cooperating element shown partly schematically.

FIG. 8 shows an embodiment of my invention especially adapted for use where variations of temperature and humidity may be encountered. Both variables tend to degrade electrets and hasten their deterioration.

The apparatus comprises a two-part cylindrical housing including a lower port 115 threaded at 117 to engage cooperating threads 119 formed on an upper cylindrical portion 121. The housing parts may be made of metal.

The lower housing portion 115 is adapted to contain a preamplifier, schematically indicated at 123, having one input terminal connected to the casing 115 and the other input terminal connected to a conventional connector 125 adapted to make electrical contact with a mating connector part 127 in the housing 121.

The connector element 127 is provided with flanges, as at 129, to receive a sealing diaphragm 131, of rubber or the like. The diaphragm 131 is connected at its periphery by a connecting ring 133 and the base of a mounting element 135 to seal the lower end of the housing 121.

The mounting element 135 has a floor 137 in which a shaft extension 139 of the connector element 127 is fixed. A capillary tube 141 passes through the floor 137 of the mounting element 135 to provide relief of any pressure differential which may exist across the floor 137. Alternatively, the function of the capillary tube may be performed by making all or part of the floor 137 of sintered metal. On the floor 137 is fixed a package 143 of a suitable desiccant to remove moisture from the air in the space above the diaphragm 131.

A metal backplate 142 has connected thereto a pin 145 which is received with clearance by an aperture in the shaft 139 of the connector element 127. A spring 147 is disposed about the shaft 139 to urge the backplate 142 upwardly away from the floor 137.

The backplate 142 may be made of metal chemically milled to provide apertures 149 and formed integrally with support ribs 151 at its upper side to support an electret diaphragm 153. The diaphragm 153 is metallized at its upper side and has a dielectric lower side engaging the ribs 151.

The diaphragm 153 is mounted between the upper rim 155 of the mounting element 135 and a metal retaining ring 157. The ring 157 also serves to hold a metal protective screen 159 in position against a flange 161 formed at the upper end of the housing 121.

In operation, the rubber diaphragm 131 provides an expansion seal to compensate for changes in external pressure, and the capillary 141 permits equalization of the pressure above and below the floor 137 of the mounting element 135. The electret diaphragm 153 and the conducting backplate 142 cooperate in the manner described in connection with the other embodiments of my invention.

Two purposes are served by closing the floor of the mounting element 135 except for the capillary 141. First, the chamber formed by the interior of the mounting element 135 and the diaphragm 153 provides a compression chamber of substantially fixed volume into which the diaphragm can work. Second, the capillary prevents the gradual development of a static pressure drop across the diaphragm. Such a pressure drop would affect the performance of the transducer, and might rupture the diaphragm.

While I have described my invention with respect to the details of various specific embodiments thereof, many changes and variations will be apparent to those skilled in the art upon reading my description, and such can obviously be made without departing from the scope of my invention.

Having thus described my invention, what I claim is:

[1. In an electroacoustic transducer having a backplate element and a diaphragm element, the combination of a first electrode serving as one of said elements, an electret and a second electrode bonded together serving as the other of said elements, a set of supporting members disposed in a predetermined pattern between said elements normally to hold said elements a substantially fixed distance apart and to form therewith a plurality of similar individual transducing cells in parallel and means for holding said diaphragm in taut disposition across the supporting members of said set.]

[2. In an electroacoustic transducer as defined in claim 1, the combination wherein one of said elements is imperforate and the other of said elements is perforated.]

[3. In an electroacoustic transducer as defined in claim 2, the combination wherein the grid of supporting members is an integral part of the perforated backplate element and is fabricated of molded plastic and coated with metal to provide electrical conductivity.]

[4. In an electroacoustic transducer as defined in claim 2, the combination wherein said electret consists essentially of a polyhalocarbon.]

[5. In an electroacoustic transducer as defined in claim 4, the combination wherein said polyhalocarbon comprises a material containing at least 95 percent polychlorotrifluoroethylene.]

[6. An electroacoustic transducer, comprising a pair of electrodes, at least one of said electrodes comprising a metallized film fixed to an electret having a dielectric surface confronting the other electrode, a first of said electrodes comprising a membrane serving as a diaphragm, a grid of supporting elements attached to the surface of the other electrode confronting said first electrode and adapted to engage the confronting surface of the first electrode to hold it a fixed distance from the surface of the other electrode and to form therewith a plurality of individual, similar transducing cells in parallel, and means for retaining said electrodes in assembled condition with said first electrode stretched over said grid of supporting elements and closing said cells.]

[7. In an electroacoustic transducer of the type comprising two electrodes, one attached to a diaphragm and the other forming a backplate confronting the diaphragm, one of said electrodes comprising a metallized surface on an electret, said electret forming the diaphragm and including an internally polarized sheet of dielectric material confronting the other electrode, the improvement comprising a set of supporting elements formed on the side of the backplate confronting the diaphragm, said supporting elements engaging the diaphragm to form therewith a plurality of individual transducing cells in parallel, to control the spacing between the diaphragm and the backplate and prevent electroacoustic sticking of the diaphragm to the backplate and means for holding said diaphragm in taut disposition across said supporting elements.]

[8. The transducer of claim 6 in which said first electrode is attached to an electret and the other electrode is a conductive metal backplate, in which said supporting elements comprise fine metal supports extending outwardly from the surface of the backplate to engage the dielectric surface of the electret, further comprising means including apertures formed in the backplate to provide a compression chamber large compared to the volume swept by the diaphragm during the operation of the transducer.]

[9. In combination, two transducers of claim 7 in which a set of apertures are formed in the backplates to put the spaces between the diaphragms and backplates into acoustic communication with the surfaces of the backplates opposite the diaphragms, and means mounting the transducers together with the last recited surfaces of the backplates in engagement and the metallized surfaces of the electrets forming the outer surfaces of the mounted combination.]

[10. An electroacoustic transducer, comprising an apertured conducting metal plate, a grid of fine metal wires formed on both sides of said plate, two electret diaphragms each comprising a layer of internally polarized dielectric material and a layer of metal bonded to said dielectric layer, and means for holding each of said diaphragms stretched over a different side of said apertured metal plate and supported on said metal wires, the dielectric layers of said diaphragms being in contact with said wires to form a plurality of individual similar transducing cells in parallel relationship.]

[11. An electroacoustic transducer, comprising an electret, a metallic diaphragm, and means holding the diaphragm stretched over and confronting a first surface of said electret, said electret comprising a relatively thick sheet of internally polarized dielectric material permeated with holes and having formed on said first surface a grid of supporting elements in contact with said diaphragm to form a plurality of individual transducing cells, to control the spacing between the diaphragm and the electret and to prevent electrostatic sticking of the diaphragm to the electret, and a metallic coating on a second side of said electret opposite said first side.]

12. An electroacoustic transducer, comprising an electret, a metallic diaphragm, and means holding the diaphragm stretched over and confronting a first surface of said electret, said electret comprising a relatively thick sheet of internally polarized dielectric material permeated with holes and having formed on said first surface a grid of supporting elements in contact with said diaphragm to form a plurality of individual transducing cells to control the spacing between the diaphragm and the electret and to prevent electrostatic sticking of the diaphragm to the electret, a meallic coating on a second side of said electret opposite said first side, a sheet of nonporous conducting material, means forming a chamber sealed at one end by said diaphragm and at an opposite end by said material, and a grid of nonconducting support elements in said chamber and supporting said electret above said material whereby the interstices between the support elements provide a compression chamber for said transducer, an electrical connection between one side of said material and said diaphragm, and an electrical connection between the other side of said material and said metallic coating.

[13. An electroacoustic transducer, comprising a pair of plates mounted in confronting relationship, one of said plates comprising an electret having a dielectric surface confronting the other electrode, and an opposed metallized surface, the other of said plates comprising a metallic conductor, one of said plates being relatively rigid and pierced for acoustic airflow to serve as a backplate, the other of said plates being imperforate and flexible to serve as a diaphragm, a grid of supporting elements formed on the surface of the relatively rigid plate confronting the other plate, said elements and said pair of plates forming a plurality of similar individual transducing cells, and means for holding said diaphragm in taut disposition across said grip of supporting elements.]

[14. A weather-resistant electroacoustic transducer, comprising a first diaphragm, a second diaphragm, and means forming a container closed by said first diaphragm, said first diaphragm comprising an extensible, flexible imperforate seal to permit expansion and contraction of the space enclosed by the container, said second diaphragm comprising a first flexible, imperforate electrode, a second perforated electrode mounted in a confronting relation to said first electrode, one of said electrodes comprising an electret having a conducting surface and a dielectric surface, said dielectric surface confronting the other electrode, and a grid of support elements formed on the surface of the second electrode confronting the first electrode for engaging and supporting the first electrode in substantially fixed spaced relationship, said elements and said electrodes forming a plurality of individual transducing cells in parallel relationship.]

[15. The transducer of claim 14, further comprising means forming a chamber having a substantially constant volume within said container and closed by said second diaphragm, said chamber enclosing said perforated electrode, and said chamber having at least one restricted passage in communication with the region of said container closed by said first diaphragm to permit gradual equalization of pressures on opposite sides of said second diaphragm.]

[16. An electret which consists essentially of an electrostatically polarized polyhalocarbon.]

[17. An electret as defined in claim 16 wherein said polyhalocarbon is at least 95 percent polychlorotrifluoroethylene.]

[18. An electret as defined in claim 17 in the form of a film having a thickness between 0.0005 inch and 0.010 inch.]

[19. The electroacoustic transducer of claim 1 wherein said means for holding said diaphragm in taut disposition comprises support means in fixed position relative to said backplate and means for firmly pressing said diaphragm against said supporting means.]

[20. The electroacoustic transducer of claim 1 wherein said set of supporting element is in grid configuration.]

*21. An electroacoustic transducer comprising*

*an electrically conductive diaphragm electrode element,*

*an electrically conductive backplate electrode element,*

*an electret,*

*a set of supporting members, and*

*diaphragm holding means,*

*said diaphragm element and said backplate element being in superposed relationship with facing surfaces,*

*said electret being bonded to one of said diaphragm element and said backplate element over one of said facing surfaces,*

*portions of the backplate element facing surface, situated to participate in transducer action, in spaced relation to the diaphragm element facing surface,*

*said supporting members extending between said portions of said backplate element facing surface and said diaphragm element facing surface in a regular pattern to space said elements apart a corresponding distance thereat, and to define a plurality of cells in side-by-side relation, all of corresponding shape, area, and depth intermediate said supporting members, said area and said depth being coordinated to prevent said diaphragm sticking to said portions of said backplate element facing surface,*

*said diaphragm element being held by said holding means around the periphery of said diaphragm in taut disposition across said set of supporting members, said diaphragm element being attracted toward said backplate element by attractive forces between said electret and said element not including said electret and said diaphragm element being attached to said supporting members by, and solely by, said attractive forces,*

*and said backplate element having openings therein,*

*said diaphragm element being integral, for unitary vibratile movement within each cell relative to said set of supporting members,*

*whereby said diaphragm element is precluded from contacting during normal vibratile use said portions of said backplate facing surface, and portions of said diaphragm element form with said portions of said backplate facing surface a plurality of matching individual transducer cells in parallel.*

*22. The transducer of claim 21 in which the surfaces of said supporting members which abut said diaphragm element are planar and parallel with said diaphragm element facing surface.*

*23. The transducer of claim 21 which includes a base member, said base member defining with an opposite surface of said backplate element an acoustic compression chamber, and said backplate element having therethrough, within groups of said set of supporting members, said openings, said openings extending therethrough, portions of said diaphragm element within said groups of said set of supporting member forming said plurality of said cells.*

*24. An electroacoustic transducer as defined in claim*

*21, wherein said set of supporting members is an integral part of said backplate element and is fabricated of molded plastic and coated with metal to provide electrical conductivity.*

*25. The transducer of claim 21 in which said electret is bonded to said diaphragm element through metallization.*

References Cited

The following references, cited by the Examiner, are of record in the patented file of this patent or the original patent.

UNITED STATES PATENTS

| | | | |
|---|---|---|---|
| 2,944,119 | 7/1960 | Albright et al. | 179—111 R |
| 3,041,418 | 6/1962 | Lazzery | 179—111 R |
| 3,458,713 | 7/1969 | Perlman et al. | 307—88 ET |

| | | | |
|---|---|---|---|
| 3,474,197 | 10/1969 | Koukal et al. | 179—111 E |
| 3,316,620 | 5/1967 | Stewart, Jr. | 307—88 ET |
| 1,975,801 | 10/1934 | Rieber | 179—111 R |
| 1,813,855 | 7/1931 | Klar | 179—111 |
| 1,825,232 | 9/1931 | Huth et al. | 179—111 |
| 1,930,518 | 10/1933 | High | 179—111 |
| 3,118,022 | 1/1964 | Sessler et al. | 179—111 |
| 3,358,084 | 12/1967 | Ashworth | 179—1 |
| 3,436,492 | 4/1969 | Reedyk | 179—111 |

FOREIGN PATENTS

| | | | |
|---|---|---|---|
| 832,276 | 4/1960 | Great Britain | 179—111 E |
| 1,059,307 | 2/1967 | Great Britain | 179—111 |

DAVID L. STEWART, Primary Examiner

UNITED STATES PATENT AND TRADEMARK OFFICE

CERTIFICATE OF CORRECTION

PATENT NO. : Re. 28,420

DATED : May 13, 1975

INVENTOR(S) : Preston V. Murphy

It is certified that error appears in the above-identified patent and that said Letters Patent are hereby corrected as shown below:

Column 2, line 47, "making" is changed to --masking--.

Column 3, line 68, "relatively" is changed to --relative--.

Column 5, line 9, "surfaec" is changed to --surface--;
line 48, "plasms" is changed to --plasma--;
line 55, "problem" is changed to --problems--.

Column 9, line 6, "port" is changed to --part--.

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*